(12) United States Patent
Shelleby et al.

(10) Patent No.: US 6,579,491 B2
(45) Date of Patent: Jun. 17, 2003

(54) INSULATED COVER FOR TORPEDO CARS AND METHOD OF FORMING AN INSULATED COVER

(75) Inventors: Robert A. Shelleby, Pittsburgh, PA (US); Donald K. Wiseman, Jr., Cranberry, PA (US)

(73) Assignee: M.S.S.I., Inc., McKees Rocks, PA (US)

( * ) Notice: Subject to any disclaimer, the term of this patent is extended or adjusted under 35 U.S.C. 154(b) by 0 days.

(21) Appl. No.: 09/999,265

(22) Filed: Nov. 15, 2001

(65) Prior Publication Data

US 2002/0086170 A1 Jul. 4, 2002

Related U.S. Application Data

(60) Provisional application No. 60/249,141, filed on Nov. 16, 2000.

(51) Int. Cl.$^7$ .............................................. C21B 13/00
(52) U.S. Cl. .................... 266/44; 266/165; 266/272; 266/280; 266/287; 29/428; 428/457; 428/920
(58) Field of Search .................... 266/44, 165, 280, 266/272, 287; 428/457, 920; 29/428

(56) References Cited

U.S. PATENT DOCUMENTS 5,882,576 A * 3/1999 Shelleby et al. ............ 266/287

* cited by examiner

*Primary Examiner*—Melvyn Andrews
(74) *Attorney, Agent, or Firm*—Webb Ziesenheim Logsdon Orkin & Hanson, P.C.

(57) ABSTRACT

Improvements to an insulating cover for covering an opening in a torpedo car are disclosed. The insulating cover includes upper and lower wire mesh layers and an insulating layer positioned between the wire mesh layers. A support rod may be provided which extends beyond the ends of the upper and lower wire mesh layers. A pair of support rods in an "X" configuration may be provided which extend beyond the side edges of the upper and lower wire mesh layers. Tie devices secure the wire mesh layers together and hold the insulating layer in position. At least one ferromagnetic plate is provided, whereby each ferromagnetic plate provides a lift point for lifting the insulating cover, such as with an electromagnet or the like. Methods for constructing the embodiments of the insulating cover are also disclosed.

21 Claims, 5 Drawing Sheets

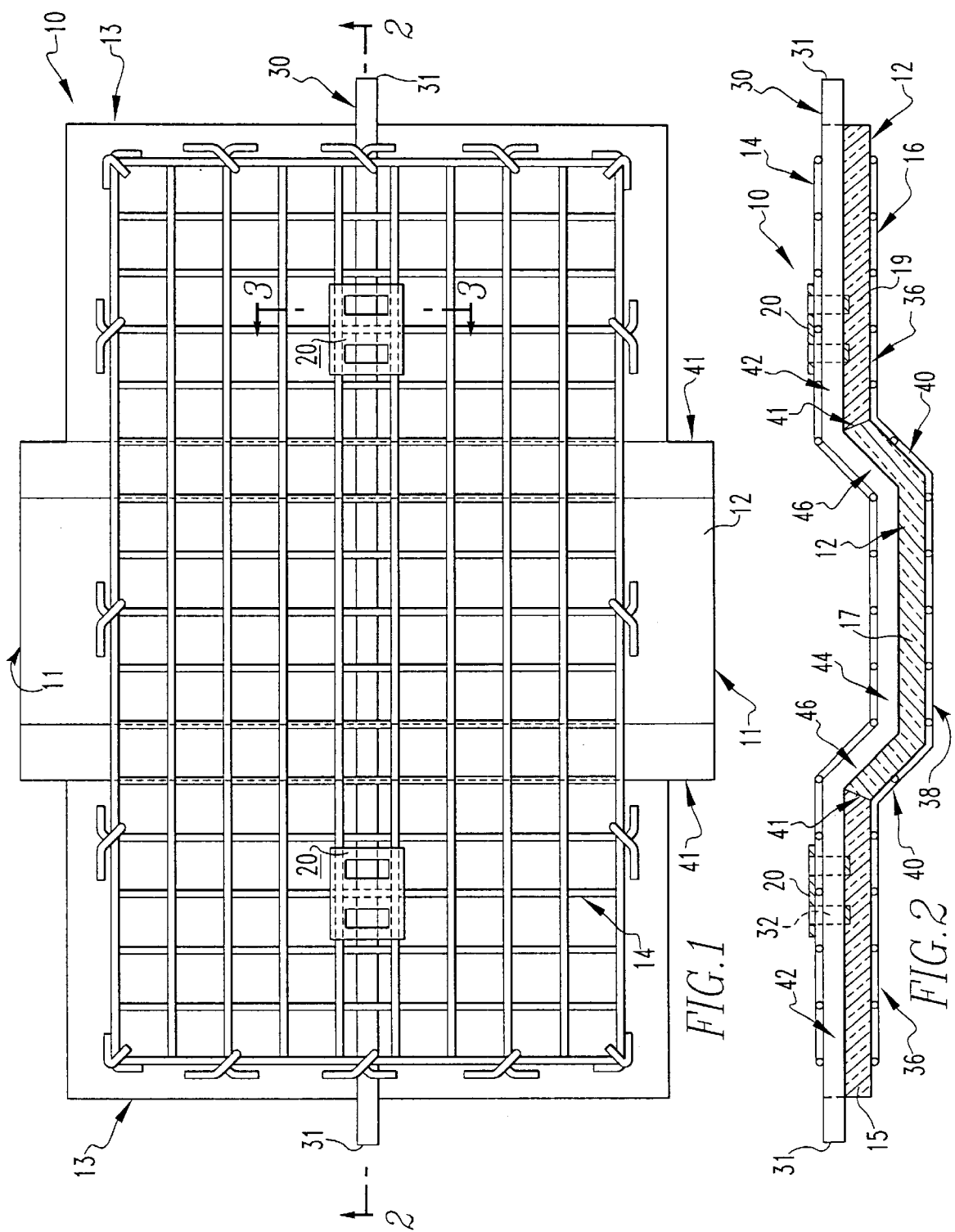

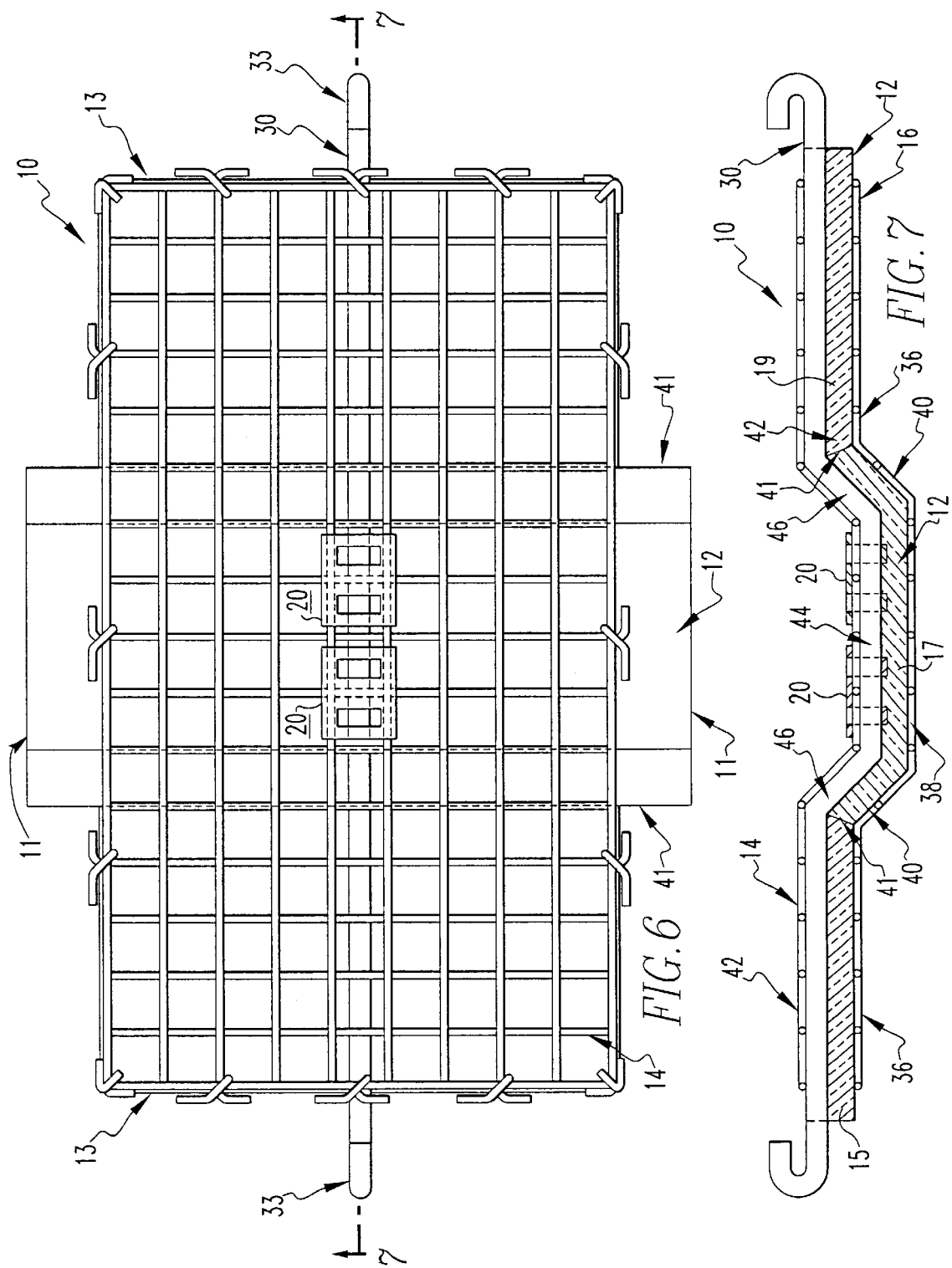

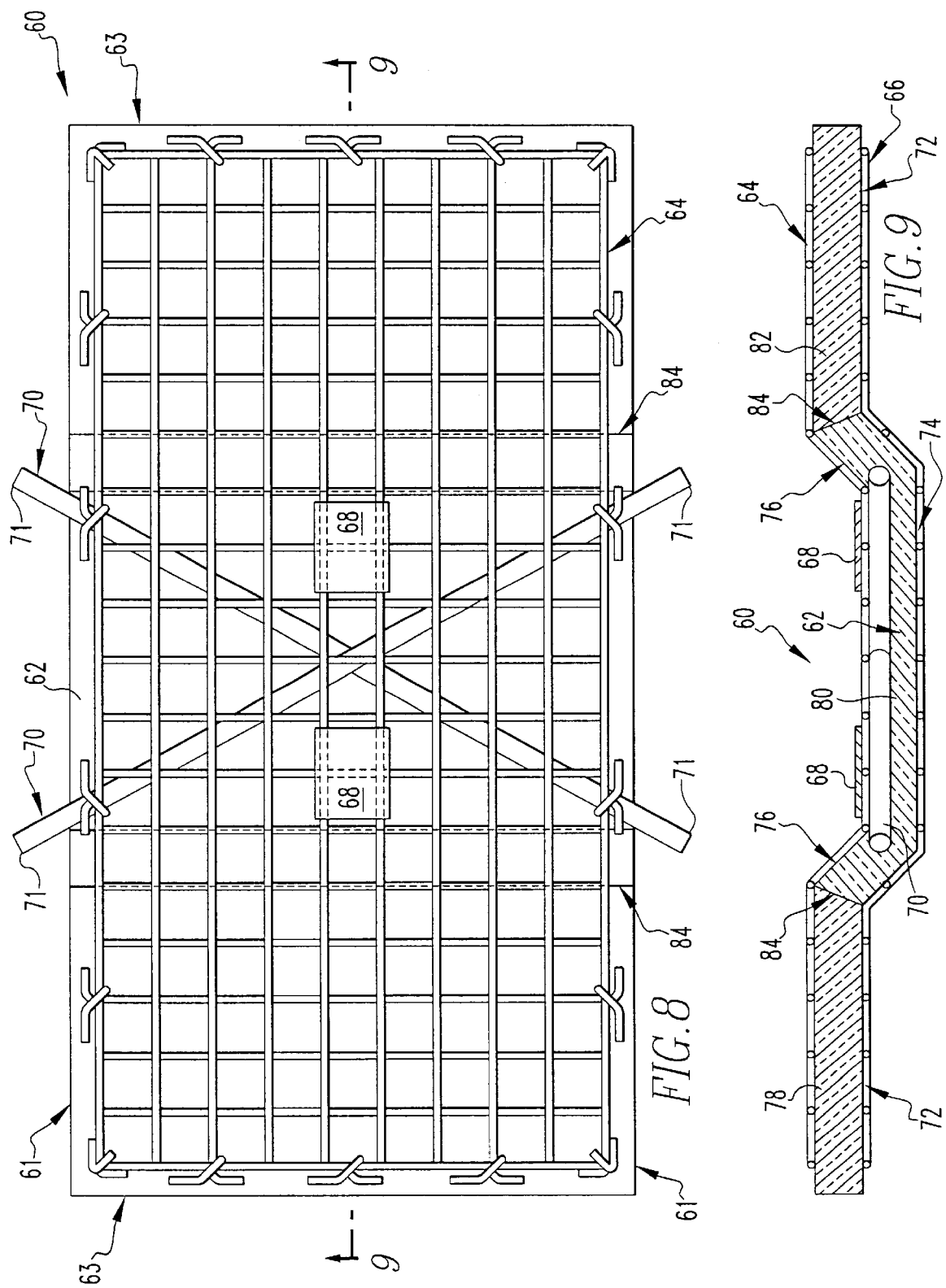

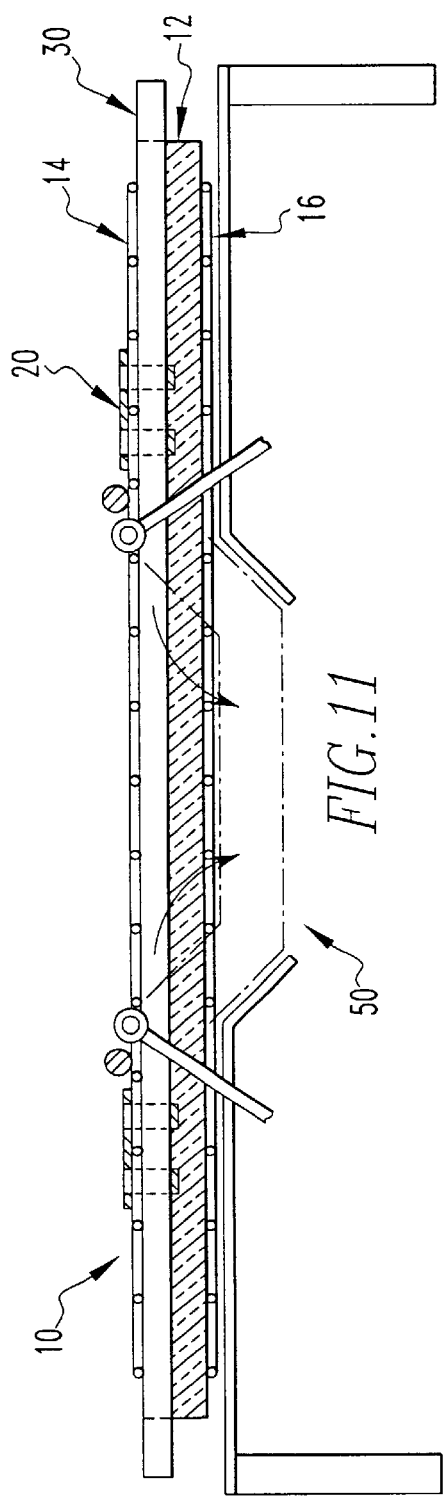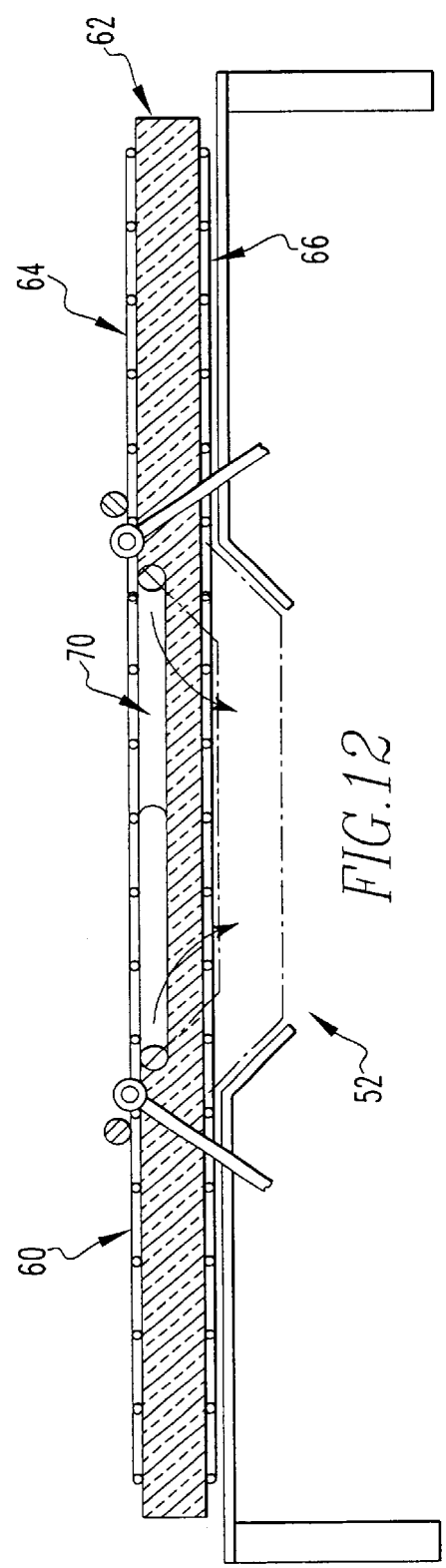

INSULATED COVER FOR TORPEDO CARS AND METHOD OF FORMING AN INSULATED COVER

CROSS-REFERENCE TO RELATED APPLICATIONS

This application claims the benefit of U.S. Provisional Patent Application Ser. No. 60/249,141 filed Nov. 16, 2000.

BACKGROUND OF THE INVENTION

1. Field of the Invention

This invention relates to heat retention within torpedo cars, and more specifically toward improvements in insulating covers which are configured for easy and safe positioning on torpedo cars.

2. Description of the Prior Art

Torpedo cars, also referred to as ladle cars, are employed for carrying molten metal from one location to another. Typically, the hot metal is transported between the blast furnace and the melt facility by a torpedo car. It is desirable to retain the temperature within the torpedo car as high as possible between the emptying of and the subsequent refilling with molten metal. Temperature retention is desired to minimize the molten metal temperature loss occurring during the next refilling.

It is well known to form a shield or insulating cover to cover the opening of a torpedo car, such as a wire mesh enclosed refractory containing sheet. Examples of such insulating covers can be found in U.S. Pat. Nos. 4,381,855; 4,390,170; 4,424,956; and 4,424,957. These prior art insulating covers have several disadvantages including difficulty in manually engaging and positioning these covers on the torpedo car opening with hooks or the like.

A more recent invention disclosed in U.S. Pat. No. 5,882,576 was developed to overcome the drawbacks of the aforementioned prior art insulating covers. That invention teaches an insulating cover for covering an opening in a torpedo car. The insulating cover includes an upper wire mesh layer and a lower wire mesh layer with an insulating layer positioned between the upper and lower wire mesh layers. Tie devices secure the upper wire mesh layer and the lower wire mesh layer together and hold the insulating layer in position. Additionally, a pair of ferromagnetic plates are coupled to the upper wire mesh layer, whereby each ferromagnetic plate provides a lift point for lifting the insulating cover, such as with an electromagnet or the like.

In that invention, a pair of support rods may be positioned with one of the support rods between each ferromagnetic plate and the lower wire mesh layer. Each support rod extends beyond the side edges of the upper and lower wire mesh layers and has a length greater than the width of the torpedo car opening.

In one embodiment, each ferromagnetic plate is positioned on top of the upper wire mesh layer and includes a pair of support strips extending below the upper wire mesh layer and forming a locating hole on the underside of the ferromagnetic plate. A support rod extends through the locating hole to couple the ferromagnetic plate to the upper wire mesh layer. Tie devices secure each support rod into position.

That insulating cover may be shaped to fit within the opening of the torpedo car such that the upper and lower wire mesh layers each include a pair of planar outer sections and a recessed central section. This formed configuration with the recessed central section will provide a better fit of the insulating cover within the opening of the torpedo car.

That insulating cover is easily manufactured according to the following steps. The lower wire mesh layer, the upper wire mesh layer, and the insulating layer positioned between the upper and lower wire mesh layers are positioned on a bending frame. The upper and lower wire mesh layers are bent on the bending frame to form the pair of planar outer sections and the recessed central section. The ferromagnetic plates are appropriately coupled to the upper wire mesh layer. The upper and lower wire mesh layers are secured together with the tie devices, thereby maintaining the insulating cover together.

However, sometimes the support rods in the torpedo car cover of U.S. Pat. No. 5,882,576 interfere with the forklifts used to transport the cover to and from the area of the torpedo car since the support rods extend beyond the side edges of the wire mesh layers. When a forklift approaches the cover, the support rods deflect the cover and make it difficult to maneuver the forklift to pick up the cover.

Therefore, a need exists to develop a torpedo car cover that is easily manufactured, installed, and removed.

SUMMARY OF THE INVENTION

The present invention provides improvements to an insulating cover for covering an opening in a torpedo car. The insulating cover of the present invention includes an upper wire mesh layer and a lower wire mesh layer with an insulating layer positioned between the upper and lower wire mesh layers. The insulating layer may extend beyond the peripheral edges of the upper and lower wire mesh layers and may be formed of a ceramic fiber material.

Tie devices secure the upper wire mesh layer and the lower wire mesh layer together and hold the insulating layer in position. The tie devices may include a plurality of wire ties extending through the insulating layer and securing the upper and lower wire mesh layers together.

A pair of ferromagnetic plates is coupled to the upper wire mesh layer, whereby each ferromagnetic plate provides a lift point for lifting the insulating cover, such as with an electromagnet or the like. One embodiment of the present invention provides that the upper and lower wire mesh layers be substantially formed of 6"×6" wire grid with each of the ferromagnetic plates being a 6"×12" steel plate.

The insulating cover may be shaped to fit within the opening of the torpedo car such that the upper and lower wire mesh layers each include a pair of planar outer sections and a recessed central section. This formed configuration having the recessed central section will provide a better fit for the insulating cover within the opening of the torpedo car.

In one embodiment, a support rod may be positioned between the upper and lower wire mesh layers to extend beyond the ends of the upper and lower wire mesh layers. The support rod has a length greater than the widest portion of the torpedo car opening. Each of the pair of ferromagnetic plates is positioned on top of the upper wire mesh layer and includes at least one support strip extending below the upper wire mesh layer and forming a locating hole on the underside of the ferromagnetic plate. The support rod extends through the locating hole to couple the ferromagnetic plate to the upper wire mesh layer. Tie devices secure the support rod into position.

In another embodiment, a pair of support rods may be positioned forming an "X" over a central portion of the insulating cover. The pair of support rods is positioned between the upper and lower wire mesh layers to extend beyond the side edges of the upper and lower wire mesh layers. Each support rod has a length greater than the widest portion of the torpedo car opening. Tie devices secure the support rods into position.

Either end of the support rod or rods may be straight or turned on itself to form a blunted or rounded end. This avoids the unsafe condition of a rather pointed rod end spearing someone or something.

BRIEF DESCRIPTION OF THE DRAWINGS

FIG. 1 is a schematic top view of an insulating cover according to a first embodiment of the present invention having a support rod with straight ends and a pair of electromagnetic plates located on planar sections of the cover;

FIG. 2 is a schematic, cross-sectional side view of the insulating cover shown in FIG. 1 taken along line 2—2;

FIG. 6 is a schematic top view of the insulating cover shown in FIG. 1 having the support rod with rounded ends and the pair of electromagnetic plates located on a recessed central section;

FIG. 7 is a schematic, cross-sectional side view of the insulating cover shown in FIG. 6 taken along line 7—7;

FIG. 8 is a schematic top view of an insulating cover according to a second embodiment of the present invention having a pair of support rods;

FIG. 9 is a schematic, cross-sectional side view of the insulating cover shown in FIG. 8 taken along line 9—9;

FIG. 11 is a schematic side view of a bending frame according to a method of the present invention; and FIG. 12 is a schematic side view of a bending frame according to another method of the present invention.

DESCRIPTION OF THE PREFERRED EMBODIMENTS

Figure 3:
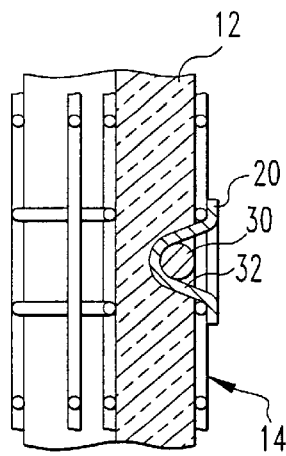
FIG. 3 is a schematic, partial, cross-sectional view showing an electromagnetic plate and a support rod of the insulating cover shown in FIG. 1 taken along line 3—3.

A complete understanding of the invention will be obtained from the following description when taken in connection with the accompanying drawing figures wherein like reference characters identify like parts throughout.

For purposes of the description hereinafter, the terms "upper", "lower", "right", "left", "vertical", "horizontal", "top", "bottom", and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Referring to FIGS. 1–3, an insulating cover 10 is formed by an insulating layer 12 held between an upper wire mesh layer 14 and a lower wire mesh layer 16. The insulating cover 10 has opposed long side edges 11 and opposed short ends 13. The upper and lower wire mesh layers 14 and 16 may be formed of 10-gauge wire forming a 6"×6" grid or mesh structure.

The insulating cover 10 has a configuration with a recessed central area to better fit within the torpedo car opening. That is, each of the upper and lower wire mesh layers 14 and 16 includes a pair of planar sections 36, a recessed central section 38, and a pair of connecting portions 40 extending between the planar outer sections 36 and the recessed central section 38, as shown in FIG. 2. The insulating layer 12 may extend beyond the upper and lower wire mesh layers 14 and 16 in the recessed central section 38 to a greater extent than in the pair of planar sections 36, as shown in FIG. 1.

The insulating layer 12 may be formed of a 1" ceramic fiber blanket that may overlap the peripheral edges of the upper and lower wire mesh layers 14 and 16. The insulating layer 12 may be in three pieces 15, 17, and 19 that are positioned side-by-side and overlap at the connecting portions 40 forming ceramic joints 41.

A pair of ferromagnetic plates 20 is positioned on the upper wire mesh layer 14. Each ferromagnetic plate 20 provides a lift point for lifting the insulating cover 10, such as by a pair of electromagnets 22 which can be manipulated in any conventional manner, for example, by a forklift or crane. Each ferromagnetic plate 20 may be made of a 6"×12" plate formed of 11-gauge steel. The pair of ferromagnetic plates 20 may be positioned on the upper wire mesh layer 14 on the pair of planar sections 36, as illustrated in FIGS. 1 and 2. Likewise, the pair of ferromagnetic plates 20 may be positioned on the upper wire mesh layer 14 on the recessed central section 38, as illustrated in FIGS. 6 and 7.

Figure 4:
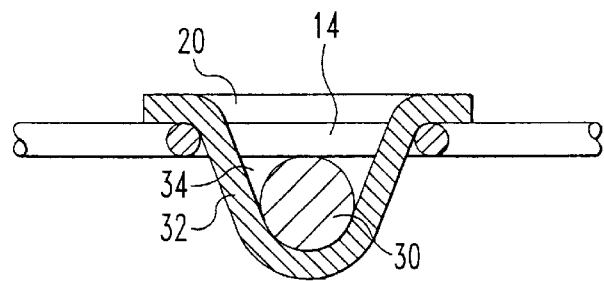
FIG. 4 is a schematic partial view of the insulating cover shown in FIG. 3.

Each ferromagnetic plate 20 further includes at least one support strip 32, as best illustrated in FIG. 4. Each support strip 32 extends below the upper wire mesh layer 14 and forms a locating hole 34. The support strip 32 can be embossed in the ferromagnetic plate 20, punched, formed as a bracket attached to the underside of the ferromagnetic plate 20, or formed in another conventional fashion.

A support rod 30 is positioned between the upper and lower wire mesh layers 14 and 16 with the support rod 30 extending beyond the opposed ends 13 of the cover 10. Accordingly, when a transport device, such as a forklift or a crane, approaches the cover 10, the support rod 30 will not interfere with the transport device. Thus, installation and removal of the cover is facilitated.

The support rod 30 has a length greater than the widest portion (i.e., width and/or length) of the torpedo car opening to prevent the insulating cover 10 from falling through the torpedo car opening. The support rod 30 may have straight ends 31, as illustrated in FIGS. 1 and 2. Likewise, the support rod 30 may have turned ends 33 (i.e., ends turned on themselves to be rounded or blunted) for increased protection to people or objects which may come into contact with the support rod 30, as illustrated in FIGS. 6 and 7. The support rod may also have one straight end and one turned end.

The support rod 30 is positioned adjacent each of the ferromagnetic plates 20 and extends through each locating hole 34, thereby coupling each ferromagnetic plate to the upper wire mesh layer 14. The support rod 30 includes a pair of planar sections 42, a recessed central section 44, and a pair of connecting portions 46 extending between the planar outer sections 42 and the recessed central section 44. This configuration of the support rod 30 corresponds to the configuration of the insulating cover 10.

Figure 5:
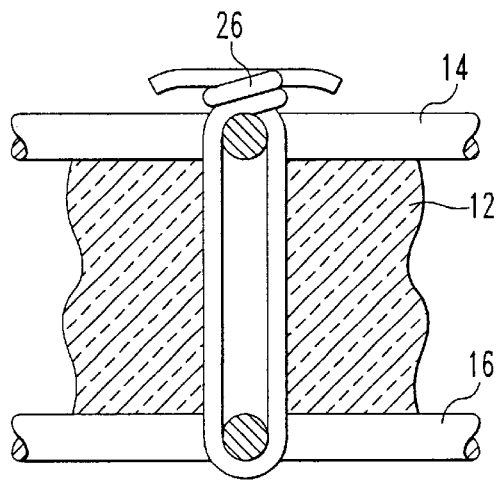
FIG. 5 is a schematic partial view illustrating a tie device of the insulating cover shown in FIG. 1.

Referring to FIG. 5, a plurality of tie devices 26 secures the upper and lower wire mesh layers 14 and 16 together and holds the insulating layer 12 in position. The individual tie devices 26 may be wire ties formed of 0.080" wire. The wire ties 26 are wrapped around individual wire elements of the upper and lower wire mesh layers 14 and 16 extending through the insulating layer 12. The ends of each of the individual wire ties 26 extend along the upper wire mesh layer 14 to avoid having the wire ties 26 interfere with other elements. The tie devices 26 are also provided at opposite ends of the support rod 30 to secure the support rod 30 into position.

Referring to FIG. 11, the method of constructing the insulating cover 10 begins with placing the pair of ferromagnetic plates 20 onto a surface with the locating holes 34 created by the support strips 32 facing up. The upper wire mesh layer 14 is turned upside down and placed onto the plates 20. The support rod 30 is inserted through the locating holes 34. This subassembly is turned back over and is placed onto a bending frame 50 that is already supporting the insulating layer 12 on top of the lower wire mesh layer 16. The tie devices 26 are installed to tie the wire mesh layers 14 and 16 together and secure the support rod 30. The cover 10 is then bent using a method similar to that disclosed in U.S. Pat. No. 5,882,576.

Referring now to FIGS. 8 and 9, an insulating cover 60 is formed by an insulating layer 62 held between an upper wire mesh layer 64 and a lower wire mesh layer 66. The insulating cover 60 has opposed long side edges 61 and opposed short ends 63. The upper and lower wire mesh layers 64 and 66 may be formed of 10-gauge wire forming a 6"×6" grid or mesh structure.

The insulating cover 60 has a configuration with a recessed central area to better fit within the torpedo car opening. That is, each of the upper and lower wire mesh layers 64 and 66 includes a pair of planar sections 72, a recessed central section 74, and a pair of connecting portions 76 extending between the planar outer sections 72 and the recessed central section 74, as shown in FIG. 9.

The insulating layer 62 may be formed of a 1" ceramic fiber blanket that may overlap the peripheral edges of the upper and lower wire mesh layers 64 and 66. The insulating layer 62 may be in three pieces 78, 80, and 82 that are positioned side-by-side and overlap at the connecting portions 76 forming ceramic joints 84.

A pair of ferromagnetic plates 68 is positioned on the upper wire mesh layer 64. Each ferromagnetic plate 68 provides a lift point for lifting the insulating cover 60, such as by a pair of electromagnets (not shown) which can be manipulated in any conventional manner, for example, by a forklift or crane. Each ferromagnetic plate 68 may be formed of a 6"×12" plate formed of 11-gauge steel.

A pair of support rods 70 is positioned between the upper and lower wire mesh layers 64 and 66. The pair of support rods 70 is positioned centrally on the cover 70 in an "X" shape with each support rod 70 extending beyond the opposed long side edges 61 of the insulating cover 60. This configuration ensures that the support rods 70 do not interfere with the transport device. The pair of support rods 70 is configured to have a length greater than the widest portion (i.e., width and/or length) of the torpedo car opening to prevent the insulating cover 60 from falling through the torpedo car opening. Each end 71 of the support rods may be straight, as shown in FIGS. 8 and 9, or turned. The pair of support rods 70 is secured into position with tie devices 78.

Figure 10:
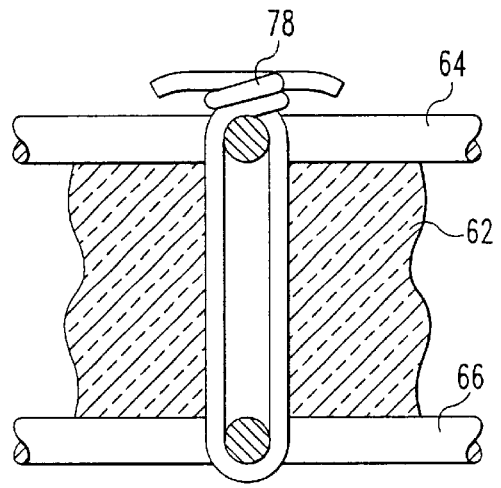
FIG. 10 is a schematic, partial, cross-sectional view illustrating a tie device of the insulating cover shown in FIG. 8.

Referring to FIG. 10, a plurality of tie devices 78 secures the upper and lower wire mesh layers 64 and 66 together, holds the insulating layer 62 in position, and secures the ferromagnetic plates 68 in position. The individual tie devices 78 may be wire ties formed of 0.080" wire. The wire ties 78 are wrapped around individual wire elements of the upper and lower wire mesh layers 64 and 66 extending through the insulating layer 62. The ends of each of the individual wire ties 78 are positioned to extend along the upper wire mesh layer 64 to avoid having the wire ties 78 interfere with other elements.

Referring to FIG. 12, the method of constructing the insulating cover 60 begins with placing the lower wire mesh layer 66 on a bending frame 52. The insulating layer 62 is placed on top of the lower wire mesh layer 66. The support rods 70 are then positioned and the upper wire mesh layer 64 is placed on top. The cover 60 is bent using a method similar to that disclosed in U.S. Pat. No. 5,882,576. The pair of ferromagnetic plates is placed on top of the upper wire mesh layer 66 and tie devices 78 are installed to tie together the upper and lower wire mesh layers 64 and 66 and secure the support rods 70 and the ferromagnetic plates 68.

It will be understood by those skilled in the art that while the foregoing description sets forth in detail preferred embodiments of the present invention, modifications, additions, and changes might be made thereto without departing from the spirit and scope of the invention, as set forth in the following claims.

We claim:

1. An insulating cover for covering an opening in a torpedo car, comprising:
   an upper mesh layer;
   a lower mesh layer;
   an insulating layer positioned between the upper mesh layer and the lower mesh layer;
   tie means for securing the upper mesh layer and the lower mesh layer together and holding the insulating layer in position;
   at least one ferromagnetic plate, whereby each ferromagnetic plate provides a lift point for lifting the insulating cover; and
   a support rod positioned between the upper mesh layer and the insulating layer, extending beyond ends of the upper mesh layer and the lower mesh layer, and having a length greater than a widest portion of the opening in the torpedo car.

2. The insulating cover of claim 1, wherein:
   a pair of ferromagnetic plates is provided, and
   the support rod is positioned adjacent each ferromagnetic plate.

3. The insulating cover of claim 2, wherein:
   each ferromagnetic plate is positioned on top of the upper mesh layer and includes at least one support strip forming a locating hole on an underside of each ferromagnetic plate, and
   each locating hole is positioned beneath the upper mesh layer and has the support rod extending therethrough to couple each ferromagnetic plate to the upper mesh layer.

4. The insulating cover of claim 1, wherein the tie means further secure the support rod into position.

5. The insulating cover of claim 1, wherein the tie means includes a plurality of wire ties extending through t he insulating layer.

6. The insulating cover of claim 1, wherein the insulating layer extends beyond peripheral edges of the upper mesh layer and the lower mesh layer.

7. The insulating cover of claim 1, wherein the insulating layer is a ceramic fiber material.

8. The insulating cover of claim 1, wherein the upper mesh layer and the lower mesh layer each includes a pair of planar outer sections and a recessed central section.

9. The insulating cover of claim 8, wherein a pair of ferromagnetic plates are located on top of the upper mesh layer, with one ferromagnetic plate on each of the planar outer sections.

10. The insulating cover of claim 8, wherein a pair of ferromagnetic plates are located on top of the upper mesh layer, with each ferromagnetic plate on the recessed central section.

11. The insulating cover of claim 8, wherein said rod includes a pair of planar outer sections and a recessed central section.

12. An insulating cover for covering an opening in a torpedo car comprising:
    an upper mesh layer;
    a lower mesh layer;
    an insulating layer positioned between the upper mesh layer and the lower mesh layer;
    tie means for securing the upper mesh layer and the lower mesh layer together and holding the insulating layer in position;
    at least one ferromagnetic plate, whereby each ferromagnetic plate provides a lift point for lifting the insulating cover; and
    a pair of support rods positioned in an "X" shape between the upper mesh layer and the insulating layer, each support rod extending beyond side edges of the upper mesh layer and the lower mesh layer and having a length greater than a widest portion of the opening in the torpedo car.

13. The insulating cover of claim 12, wherein a pair of ferromagnetic plates is provided.

14. The insulating cover of claim 12, wherein the tie means further secures the support rod into position.

15. The insulating cover of claim 12, wherein the tie means includes a plurality of wire ties extending through the insulating layer.

16. The insulating cover of claim 12, wherein the insulating layer extends beyond peripheral edges of the upper mesh layer and the lower mesh layer.

17. The insulating cover of claim 12, wherein the insulating layer is a ceramic fiber material.

18. The insulating cover of claim 12, wherein the upper mesh layer and the lower mesh layer each includes a pair of planar outer sections and a recessed central section.

19. The insulating cover of claim 18, wherein a pair of ferromagnetic plates are located on top of the upper mesh layer, with each ferromagnetic plate on the recessed central section.

20. A method of forming an insulating cover for lowering into an opening in a torpedo car, comprising the steps of:
   a) placing a lower wire mesh layer, an upper wire mesh layer, and an insulating layer positioned between the upper wire mesh layer and the lower wire mesh layers on a bending frame;
   b) bending the upper wire mesh layer and the lower wire mesh layer on said bending frame, whereby the upper wire mesh layer and the lower wire mesh layer each includes a pair of planar outer sections and a recessed central section;
   c) providing at least one ferromagnetic plate having a support strip, whereby each ferromagnetic plate provides a lift point for lifting the insulating cover;
   d) inserting a support rod between the upper wire mesh layer and the insulating layer and through the support strip, whereby the support rod extends beyond ends of the upper wire mesh layer and the lower wire mesh layer, and wherein the support rod has a length greater than a widest portion of the opening in the torpedo car; and
   e) securing the upper wire mesh layer and the lower wire mesh layer together with tie means.

21. A method of forming an insulating cover for lowering into an opening in a torpedo car, comprising the steps of:
   a) placing a lower wire mesh layer, an upper wire mesh layer, and an insulating layer positioned between the upper wire mesh layer and the lower wire mesh layers on a bending frame;
   b) bending the upper wire mesh layer and the lower wire mesh layer on said bending frame, whereby the upper wire mesh layer and the lower wire mesh layer each includes a pair of planar outer sections and a recessed central section;
   c) providing at least one ferromagnetic plate having a support strip, whereby each ferromagnetic plate provides a lift point for lifting the insulating cover;
   d) inserting a pair of support rods in an "X" shape between the upper wire mesh layer and the insulating layer and through the support strip, whereby each support rod extends beyond side edges of the upper wire mesh layer and the lower wire mesh layer, and wherein each support rod has a length greater than a widest portion of the opening in the torpedo car; and
   e) securing the upper wire mesh layer and the lower wire mesh layer together with tie means.

* * * * *